June 2, 1931. J. LEDWINKA 1,808,560
PRESSED METAL VEHICLE BODY
Filed Jan. 3, 1927 10 Sheets-Sheet 3

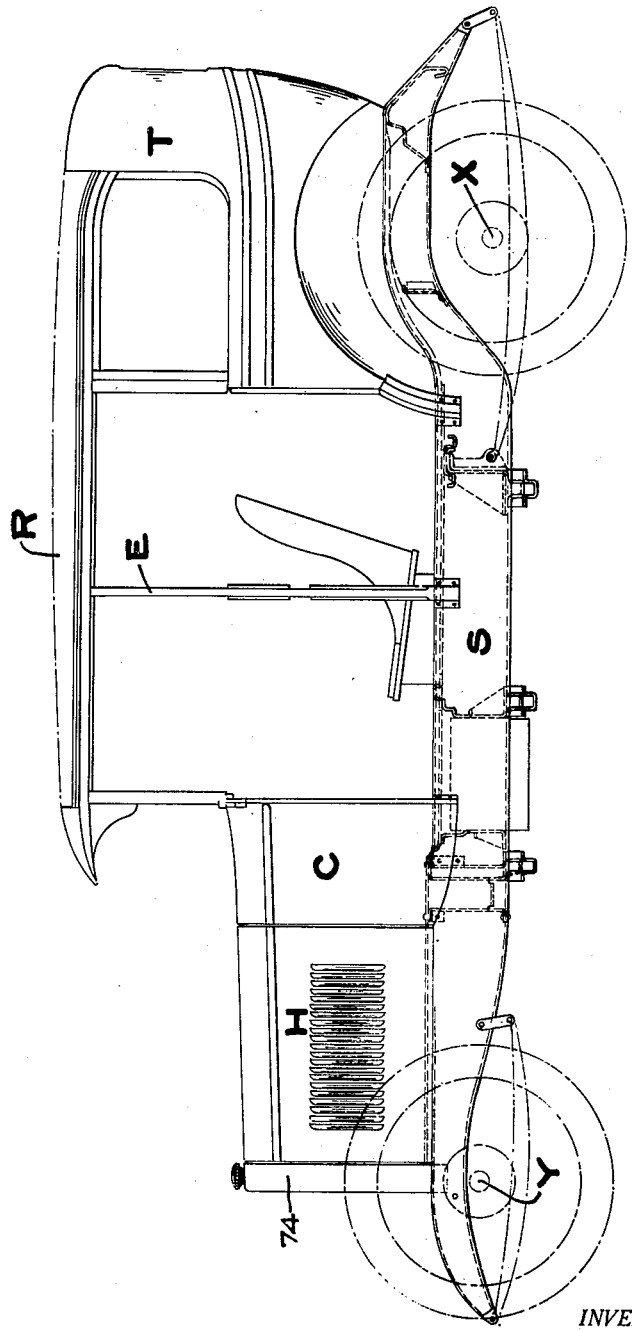

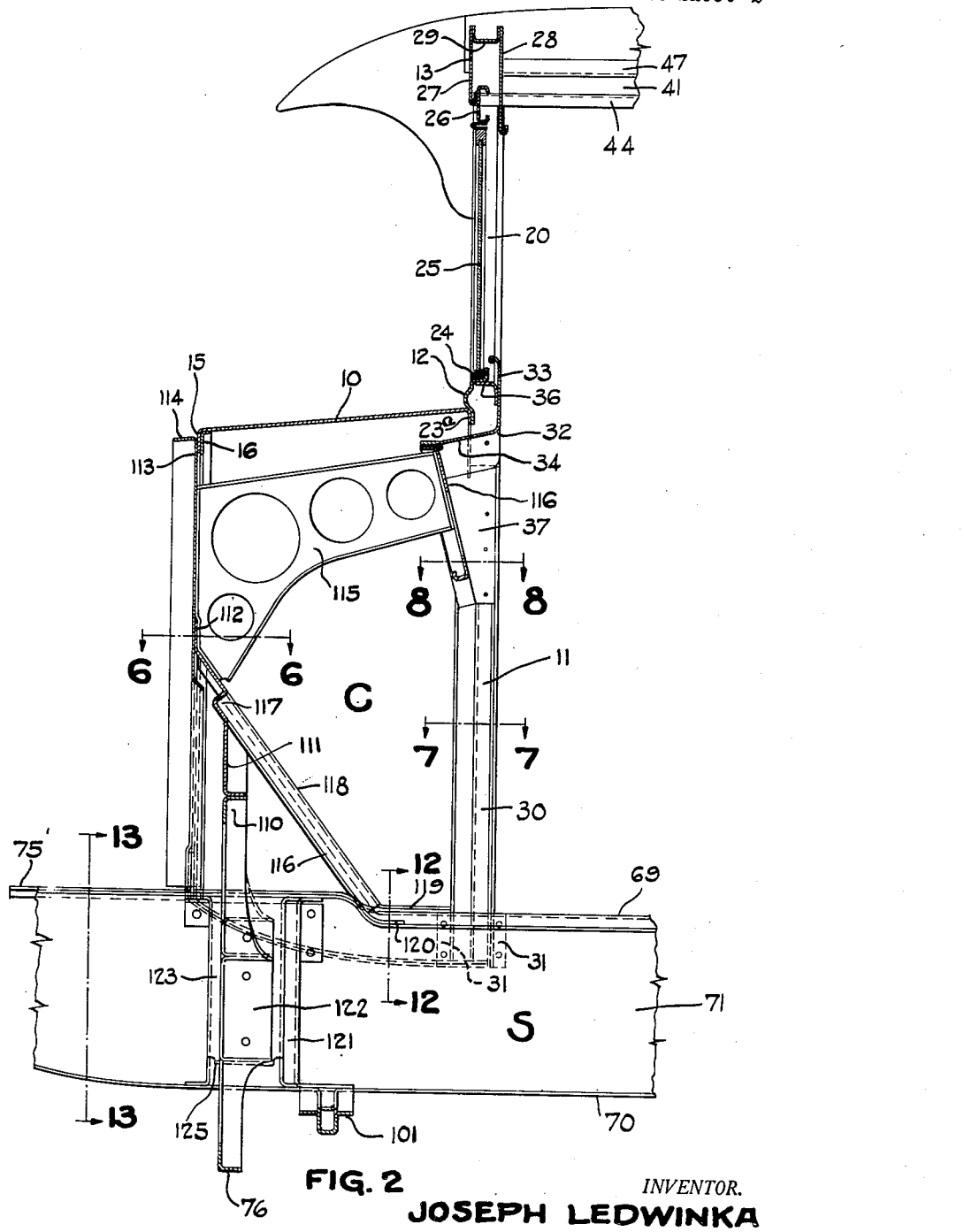

*INVENTOR.*
JOSEPH LEDWINKA
BY *John P. Tarbox*
*ATTORNEY.*

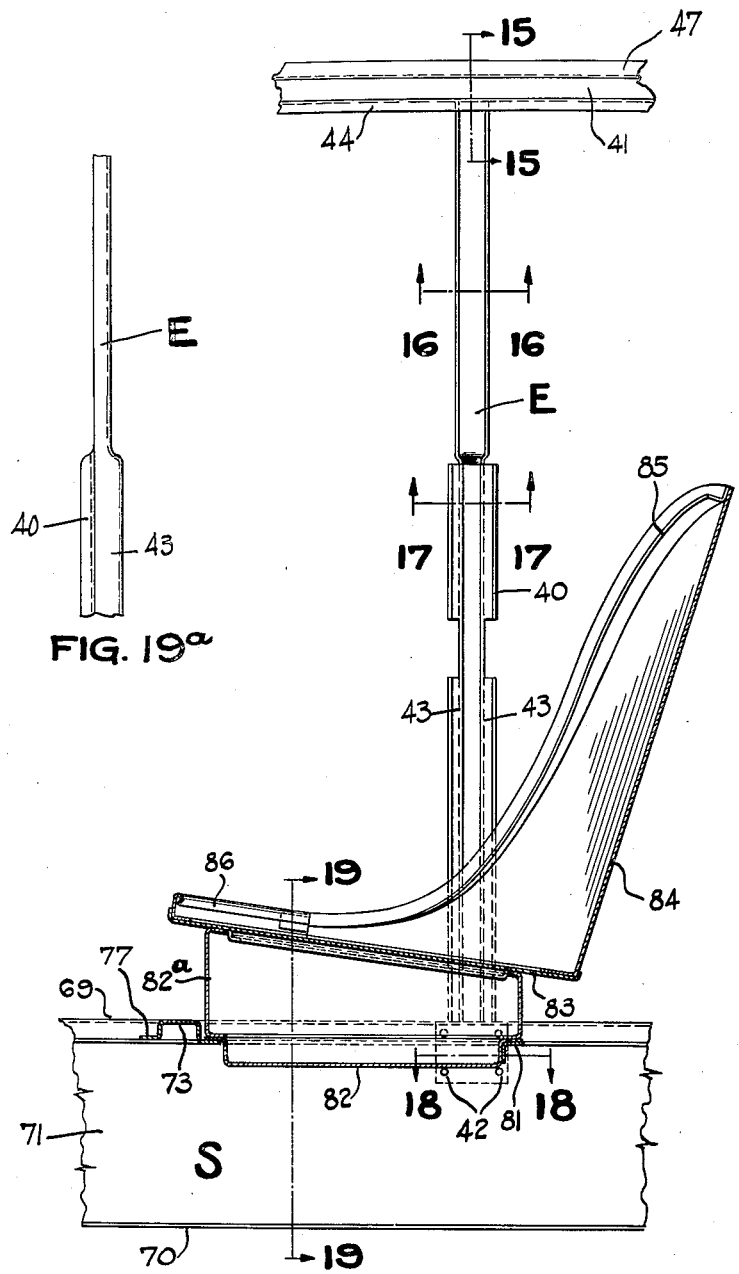

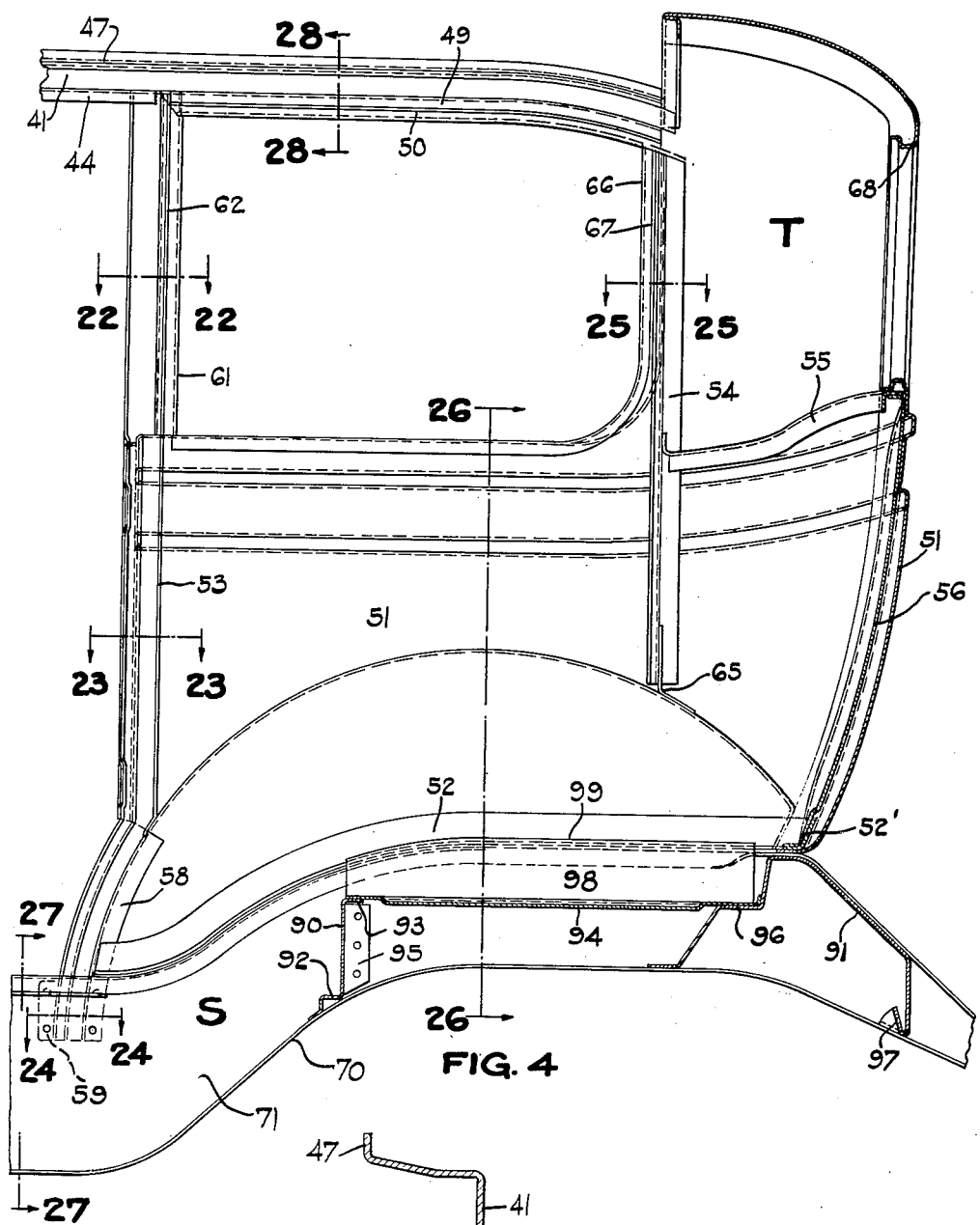

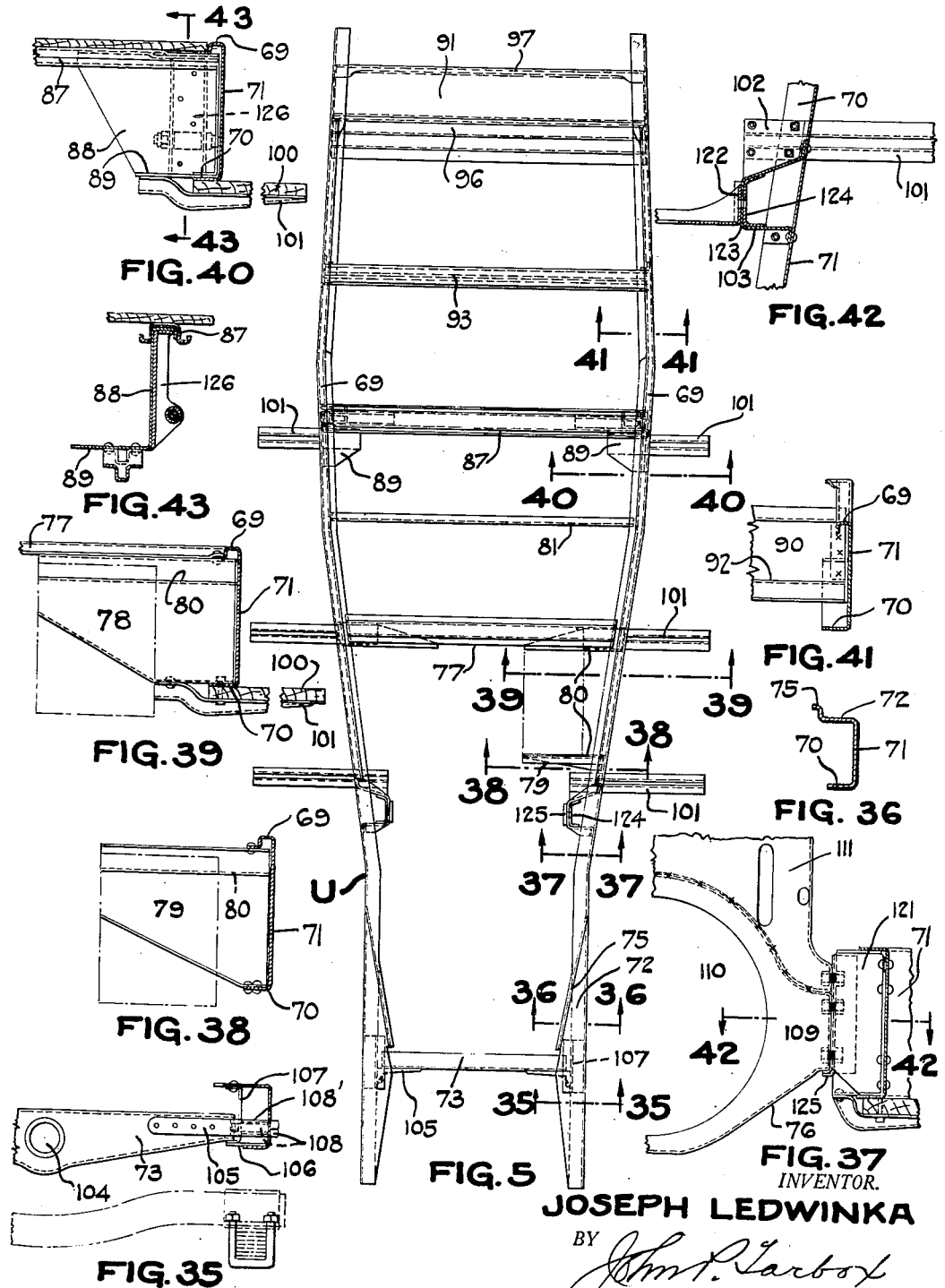
June 2, 1931.  J. LEDWINKA  1,808,560
PRESSED-METAL VEHICLE BODY
Filed Jan. 3, 1927   10 Sheets-Sheet 6
INVENTOR.
JOSEPH LEDWINKA
BY 
ATTORNEY.

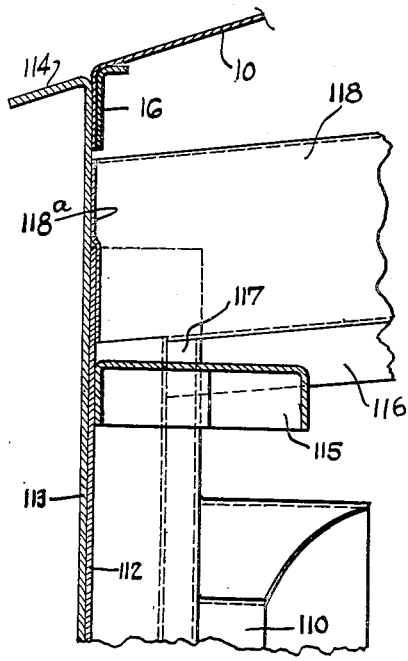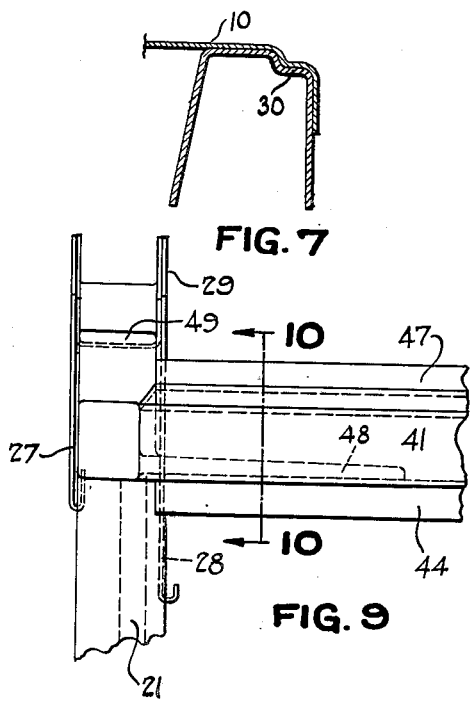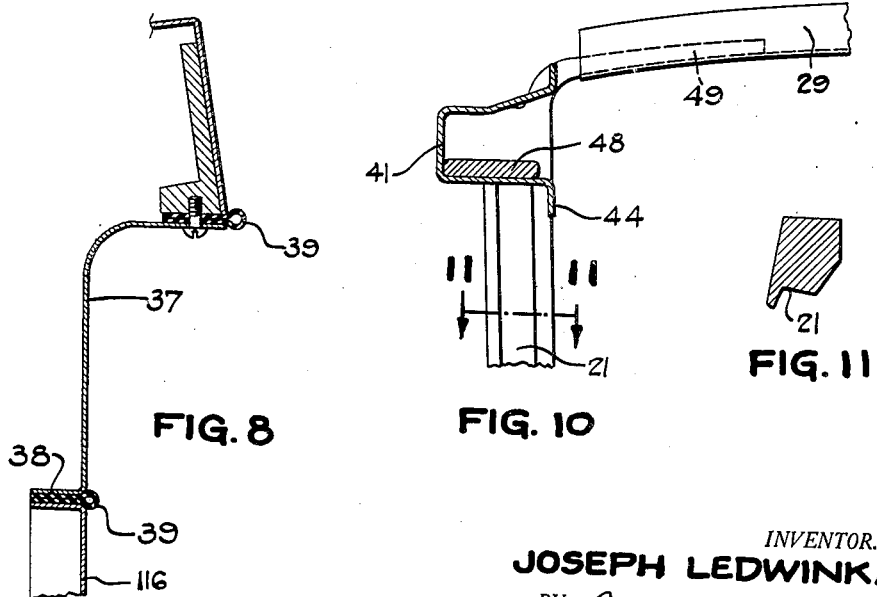

*INVENTOR.*
JOSEPH LEDWINKA
BY
*ATTORNEY.*

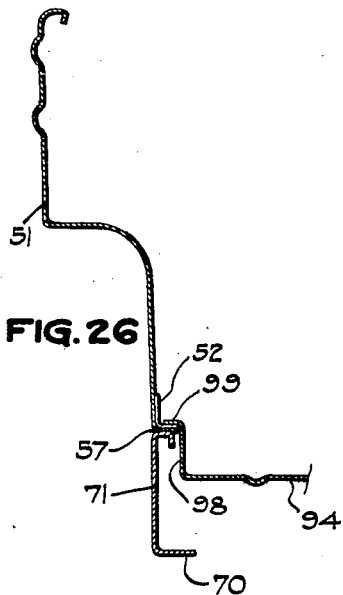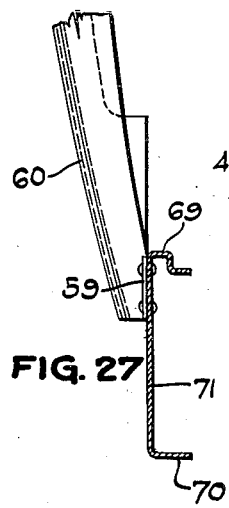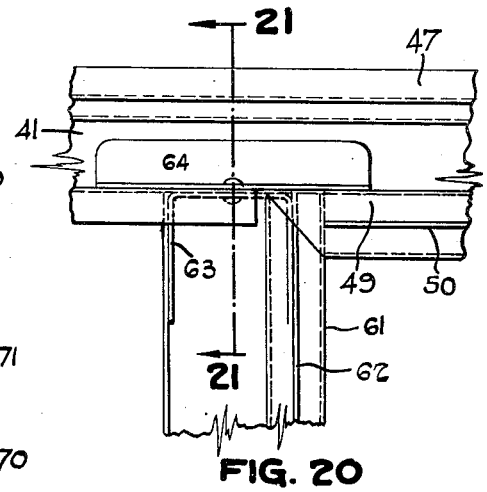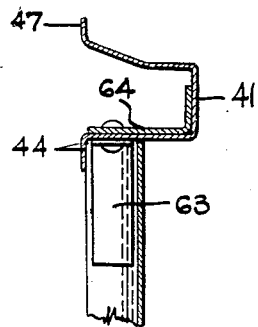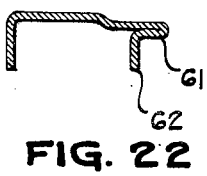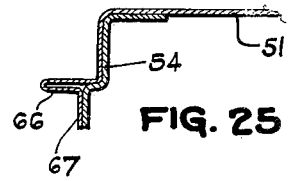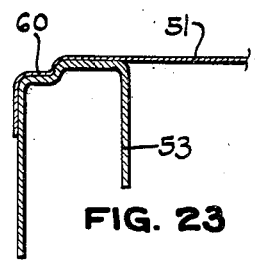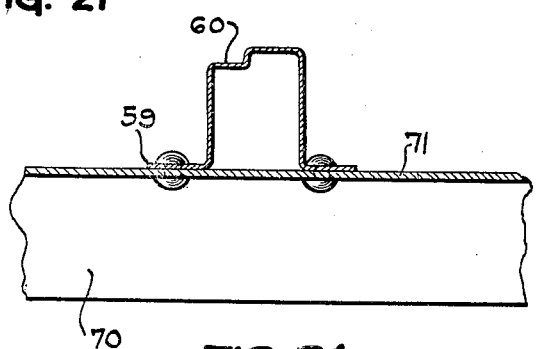

June 2, 1931.    J. LEDWINKA    1,808,560
PRESSED METAL VEHICLE BODY
Filed Jan. 3, 1927    10 Sheets-Sheet 10

INVENTOR.
JOSEPH LEDWINKA
BY John P. Larbox
ATTORNEY.

Patented June 2, 1931

1,808,560

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL VEHICLE BODY

Application filed January 3, 1927. Serial No. 158,487.

This invention has for its principal object the production of a pressed metal vehicle body which, as a body, is adapted to serve as its own chassis.

Various combinations of body and chassis have heretofore been produced with a view to making common use of certain elements for both body and chassis, produced with a view to cutting down the total number of elements used in the construction of the complete vehicle and in the assembly operations and thereby lowering costs, lessening the weight and lowering the center of gravity of the vehicle as a whole. But no inventor of whom I have knowledge has approached the problem through the invention which I have now made.

Inventors have heretofore taken a standard automobile chassis and have built directly upon it a body superstructure, utilizing the standard chassis as the underframe for the superstructure. This lowers the center of gravity somewhat but does not materially lessen the weight or the cost of manufacture since the body underframe as such is the only group of parts eliminated by this construction and these parts are ordinarily not only relatively light but also relatively not of high cost of manufacture. This procedure has involved the use of a superstructure departing widely from those standard forms, which, through the experience of the years, have been found to possess as bodies the most desirable qualities. And yet beyond this, when the relatively heavy standard chassis is used as an underframe per se for a body structure, a mechanically inharmonious construction is the result for the simple reason that the engineering criterions in the body and in the relatively heavy standard chassis are not the same. Nor are they adapted by reason of their different characteristics for efficient combination with each other.

It has also been heretofore proposed to solve the problem of body and chassis combination by constituting the main body side sills or the body underframe at large which includes the body side sills or their equivalents, the chassis construction. This approaches the problem from its opposite side, which is to say, by building the chassis upon the under side of the body rather than by building the body superstructure on top of the standard chassis. This too lowers the center of gravity somewhat but so far as I am aware, no solution according to this method has so far been proposed, which at the same time, materially lowers the cost of manufacture or materially lessens the weight of the vehicle body. For heretofore the chassis has been built upon the under side of the body and an attempt made to secure the necessary strength and other characteristics which a chassis should have for the adequate support of the automotive organs of a complete vehicle only by resort to radical change in the construction of the vehicle body itself. In short, the strength and other characteristics sought in the chassis it has been attempted to derive almost wholly through the intermediary of the body. Special forms of body have been devised including elaborate arrangements of members to constitute with the main body side sills a truss structure. One piece formations of the entire body under-frame, or of the underframe including fenders and running boards, of the entire body shell, frameless formations of such elements of peculiar shapes for peculiar purposes, have been used. Beside the sacrifice of the manifold advantages built through years of experience into the standard form of body, these radical departures from standard practice result in bodies of too complicated form to be free from manufacturing difficulties and engineering weaknesses, bodies impractical from a standpoint of easy and ready adjustment of associated parts, and bodies of irregular and insufficient interior accommodations.

But nevertheless, I have approached the solution of the problem according to my invention, also along this latter line of procedure, that is, of building on to the bottom of the body a structure adapted to serve as the chassis of the completed vehicle. But according to my invention, I adapt the main body side sills and the body underframe, which includes them, of a standard pressed metal body, of a form constituting the best accepted practice of today, to constitute the support for the various automotive organs of the complete vehicle. Such a body is of relatively light gauge sheet metal throughout, comprising a skeleton framework which includes the body underframe, and sheet metal paneling secured thereover all preferably welded together and embodying main body side sills which extend across the constitute the thresholds of the doorways of the vehicle and tie the front and rear portions of the vehicle together. Without any radical alteration of the superstructure, I constitute these pressed metal stampings constituting the main body side sills relatively of the same light gauge sheet metal as the remainder of the skeleton framework of the body. They are deepened vertically downward without substantially deepening the main bodies of the cross braces which connect them, the main bodies of the cross braces remaining of substantially the same depth as the threshold zone or upper portion of the sill which formerly served solely as a sill for the body. But the ends of these underframe cross braces I do in some cases deepen to the same extent as the body side sills and secure to both the top and bottom of the deepened section of the sill in such manner as to strengthen the same longitudinally and transversely. This vertical deepening is carried to a depth approximately one half the distance between the threshold and the ground line of the vehicle and for a longitudinal extent across and at each end beyond the doorways. The ends of this deepened sill I extend in one piece underneath and beyond the endmost portions of the body superstructure in such manner that they become cantilevers beyond the ends of the superstructure. These ends I taper off in vertical depth toward their extremities, but as they are tapered off preserving the necessary strength and stiffness by variably proportioning the top and bottom flanges, especially in the frontal extensions which are of greatest length and support the motor and its accessories.

I additionally cross brace the sills so formed by cross tying them through the body superstructure and by overlapping the sides of this superstructure upon the vertical walls of the sills and securing them preferably by overlapping parts of the skeleton framework of said superstructure to the vertical side walls of the sills. The widening flanges of the terminal extensions I anchor beneath the superstructure units and preferably to the skeleton framework. These extensions I further strengthen and reinforce at the front ends by forming flanges coacting with parts of the motor hood.

Finally, I mount the automotive organs in the space between the deepened and extended sills in such manner that the very mounting itself further strengthens and stiffens them to support these organs. The front wheels I spring directly from the under sides of the tapered fore ends of the extended sills placing the springs substantially in the place of the sills. The rear wheels I spring from the rear extremities of the sills to brackets secured to the deepened portions of the sills, such as the deepened end portions of a cross brace in planes inside of the rear ends of the sills preferably deflecting inwardly the extended rear ends of the sills to bring the springs into substantial parallelism with each other. The braking mechanisms I support within the space between the plane of relatively shallow cross braces and the bottoms of the vertically deepened sills. The motor or power organ and the transmission I support by cross braces of a vertical depth corresponding generally to the depths of the fore ends of the sills and arranged in such manner that the strength of the motor and transmission augments the strength of the body underframe which I have built to support them. And finally, I constitute the motor or power organ the tranmission organ, and the interior parts of the cowl portion of the superstructure which have to do with the control of the motor, a unitary subassembly, supporting the interior transverse structure of the cowl, independently of the cowl and its frame per se.

Through this combination of parts and the special combinations of parts to be disclosed in the detailed description which is to follow, I attain in full those important ends which have heretofore been unsuccessfully sought for and but partially realized. The center of gravity may be lowered to any extent desired consistent with the ground clearance of the body at large. The number of parts and the cost of production are both reduced most substantially. At the same time, my construction enables me to attain other ends which are even more important to the commercial success of the body. I say more important for the reason that the old practice involving the use of independent chassis and body sills has persisted through the years in spite of the fact that the earlier constructions in which it was proposed to eliminate one of these pairs of sills made possible the two advantages just recited.

At the same time that I lower the center of gravity and reduce the number of parts and the cost, I unfailingly substantially reduce the aggregate weight of the vehicle. The gross weight of the body according to my invention is approximately 20% less than the former aggregate weight of the chassis and body. I am able to employ a standard and practical form of body without alteration of the standard form of support for the various organs of the automotive vehicle. Thus, through my invention are retained all of the manifold practical advantages which years of invention and experience have given to the bodies representing the best practice of today and to the best practice in chassis construction of today. The bodies are characterized by roominess, convenience, adaptability, comfort, etc., while at the same time the support of the various organs of the automotive vehicle and their operation is as efficient and the structure as a whole even more durable than the independent structures in use today. Noises due to relative movement of independent body and chassis structures are eliminated. Accessibility and roominess are actually enhanced. The center of gravity can be carried even lower than with earlier constructions and the practical advantages of relatively light pressed metal construction heretofore derived only in independent body construction are, by my invention, rendered available in connection with the support of the various organs of the complete vehicle, and integral welded constructions to which relatively light gauge sheet metal is so well adapted are introduced into these supports. The heretofore massive chassis is eliminated altogether and its place is taken by the adapted underframe of the relatively light gauge pressed metal vehicle body itself. Simultaneously, with the substantial lowering of the weight there is a great gain in the general flexibility of the structure which gives easier riding without structural deterioration and objectionable noises. Yet the division of the structure into sub-assembly units is such that fabrication is most economical and efficient. The power organs may be removed and replaced for repair with much greater facility than heretofore. At the same time manufacturing economy is furthered by the elimination of the necessity for the preservation of those existing tolerances necessary as between the interfitting structurally independent body and chassis. The body at large may be completely assembled and upholstered as a unit, and delivered to the plant of the automobile manufacturer as a completed unit, thereto receive the various automotive organs which it is to support. As a result, the automobile manufacturer is able to institute large scale economies. His old "chassis line" and the material and labor which fed it are eliminated altogether. The wheels are sprung directly from the completed body at the head of the final assembly line. It receives the completely assembled and tested power organs as soon as the wheels are sprung and operations of assembly of the body upon the independent chassis are eliminated altogether. Provisions for mounting and connecting instrument controls are removed from the final assembly line. Beside the mounting of the power organ and its controls already assembled therewith the final assembly line requires but the mounting of the steering organs and the braking organs. The final assembly line is foreshortened and the production speeded up to a most marked degree.

In the accompanying drawings, which illustrate one embodiment of my invention—

Figure 1 represents an automobile body structure embodying the invention in side elevation.

Fig. 2 is a vertical longitudinal sectional view through the cowl portion of the body.

Figs. 3 and 4 are, respectively, vertical longitudinal sectional views through the front seat section and the tonneau section of the body.

Fig. 5 is a plan view of the underframe carrying the body superstructure and the various automotive organs ordinarily carried by the chassis of a vehicle.

Figs. 6, 7 and 8 are detail sectional views taken, respectively, on the lines 6—6, 7—7 and 8—8 of Fig. 2.

Fig. 9 is a detail view in side elevation of the joint between the top of the A post and the transverse and longitudinally extending headers.

Fig. 10 is a detail sectional view taken on the line 10—10 of Fig. 9.

Fig. 11 is a similar view taken on the line 11—11 of Fig. 10.

Figure 12:
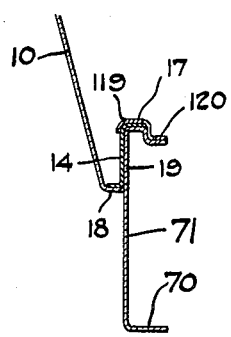
Figure 13:
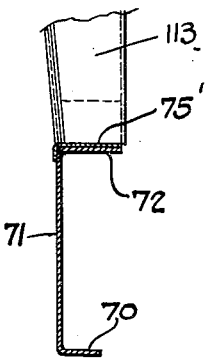

Figs. 12 and 13 are detail sectional views taken, respectively, on the lines 12—12 and 13—13 of Fig. 2.

Figure 14:
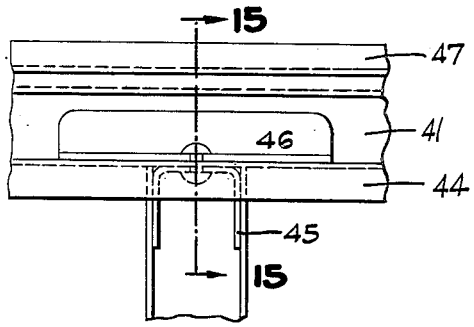

Fig. 14 is a detail view in side elevation of the inner side of the joint between the top rail and the B—C post.

Figure 15:
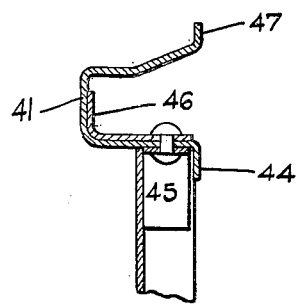

Fig. 15 is a detail sectional view taken on the line 15—15 of Fig. 14.

Figure 17:
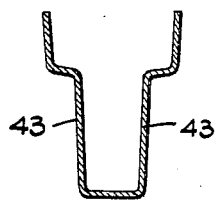
Figure 18:
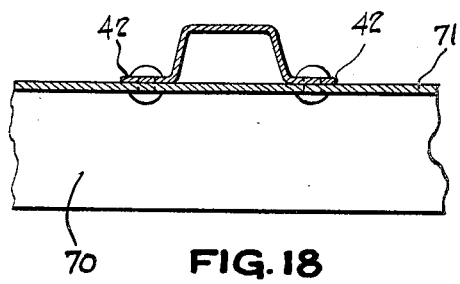
Figure 16:

Figs. 16, 17 and 18 are detail sectional views through the B—C post, taken respectively, on the lines 16—16, 17—17 and 18—18 of Fig. 3.

Figure 19:
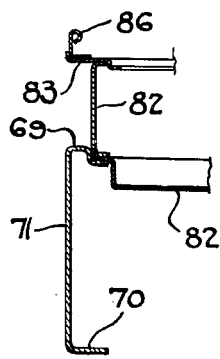

Fig. 19 is a detail sectional view through the sill and front seat structure taken on the line 19—19 of Fig. 3.

Fig. 19a is a side elevation of the central portion of the B—C post, showing the inner and outer offsets at the belt line.

Fig. 20 is a detail view in side elevation of the inner side of the joint between the top rail and the D post.

Fig. 21 is a detail sectional view taken on the line 21—21 of Fig. 20.

Figs. 22, 23, 24, 25, 26, 27 and 28 are detail sectional views taken, respectively, on the lines 22—22, 23—23, 24—24, 25—25, 26—26, 27—27 and 28—28 of Fig. 4.

Figure 29:
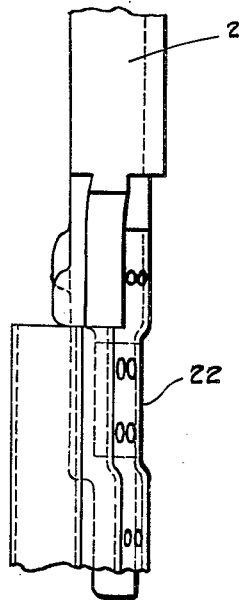
Figure 30:
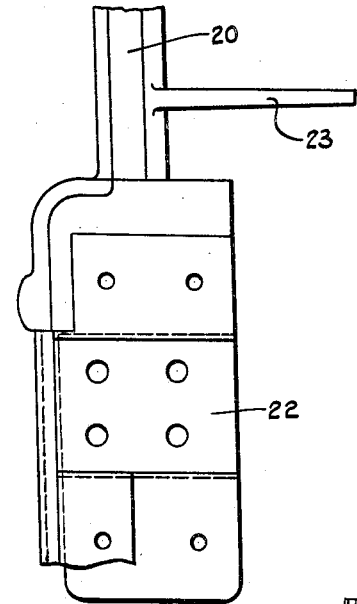

Figs. 29 and 30 are detail elevational views of the central portion of the A post as seen, respectively, from the outer side and from the rear.

Figures 31, 34:
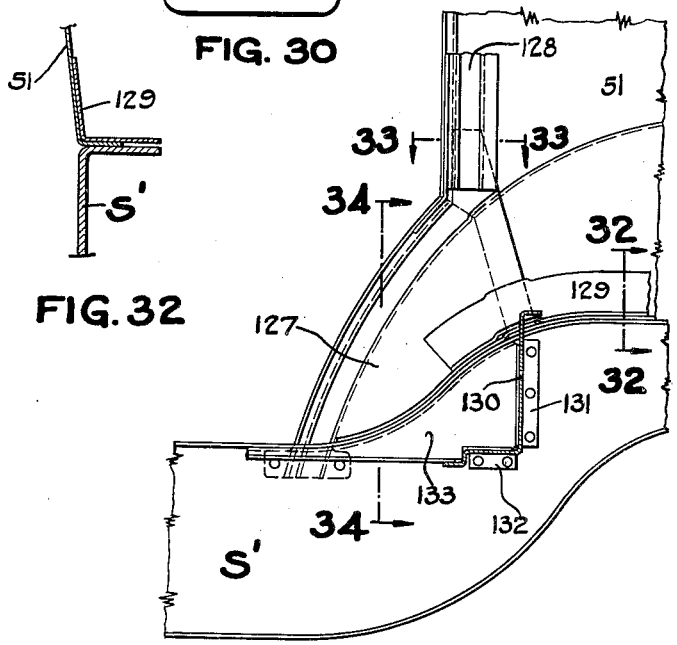

Fig. 31 is a detail side elevation, as seen from the inside, of the parts in the vicinity of the base of the D post in a slightly modified form of the invention.

Figures 32, 33:
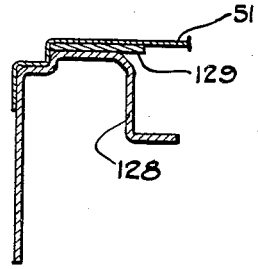

Figs. 32, 33 and 34 are detail sectional views taken, respectively, on the lines 32—32, 33—33 and 34—34 of Fig. 31.

Figs. 35, 36, 37, 38, 39, 40 and 41 are detail sectional views taken, respectively, on the correspondingly numbered lines of Fig. 5.

Fig. 42 is a detail sectional view taken on the line 42—42 of Fig. 37.

Fig. 43 is a detail sectional view taken on the line 43—43 of Fig. 40.

The same part is designated by the same reference character wherever it occurs throughout the several views.

The body superstructure which forms the foundation element of my invention is of the integral pressed metal form now well known to the industry and originally invented by myself. According to the present invention I have incorporated a number of new features in this superstructure. It is comprised of several sub-assembly units indicated in assembled relation in Fig. 1. These units are, respectively, the cowl unit C, the side units E, of which there are two, one for each side of the vehicle, the roof unit R, and the tonneau unit T. These several units are all, with the exception of the roof unit which may or may not be, of relatively light gauge sheet metal and in and of themselves possess an inherent rigidity both longitudinally and transversely for reasons which will be apparent upon an understanding of my invention.

The cowl sub-assembly unit consists principally of the cowl panel 10, the A posts 11, the lower and upper windshield headers 12 and 13 and the sub sills 14. In the present embodiment of my invention, the cowl panel extends, as usual, a substantial distance in advance of the A posts, and has its front edge flanged inwardly at 15 around the sides and top. This flanged in edge is reinforced by an angle member 16 nesting within the angle formed by the flange 15 and the body of the panel and secured to the flange, as by welding. The sub sills 14 extend from the A posts to the forward edge of the cowl and are of substantial Z shape in cross section, one arm 17 of the Z resting upon the main body side sill and the other arm 18 being secured as by welding to an inturned flange at the lower side edge of the cowl panel. When the cowl sub-assembly is assembled on the main body side sills, the top of the main side sill nests within the angle formed by the arm 17 and the web 19 of the sub-sill, thereby providing a secure seating of the cowl unit and open and effective means for securing the unit to the main side sills, as by riveting or welding. In the rear portion of the sub-sills 14 the webs thereof are relatively deep so as to secure a substantial overlap between the sub-sills and the main side sills, but toward the front portions the web gradually decreases in depth so that the bottom of the sub-sill merges by a smooth upward curve substantially into the plane of the top of the sill at the front of the cowl. The A posts 11, which are stampings of inwardly presenting channel form below the belt line, as shown in Figs. 7 and 8, are much reduced in cross section above the belt line, and as shown in Fig. 11, are made of a solid metal pillar 20, such as a casting having a rearwardly and inwardly presenting rabbet 21 to receive the edge of a door. As shown in Figs. 29 and 30, the offsets between the narrow upper portion and the lower portion of the A post are readily formed in the solid portion 20 of the post, the enlarged lower end of which telescopes into and is rigidly secured, as by screws, to the upper portion of the channel section portion of the post. As shown in Figs. 29 and 30, an offset 22 is provided in the post to receive a door hinge member substantially flush with the surface of the post. The pressed metal headers 12 and 13 are connected to the opposite A posts by any suitable means, such as lateral projections, at 23, Figs. 30 and 49, Fig. 10, on the posts which overlap the adjacent ends of the headers and are rigidly secured thereto. The lower edge of the header 12 is secured to a downturned flange 23ª of the cowl panel as by welding, and is provided above the joint with a bead, while above the bead it is bent rearwardly and then upwardly to provide a seat to receive a weather strip, as 24, and the lower edge of the windshield 25.

The upper windshield header 13 is made hollow to receive the vertically movable windshield panel 26 and windshield 25 hinged thereto, when these elements are raised by means fully disclosed and claimed in my prior application, Serial No. 69,011, filed November 14, 1925, for windshield construction. The header consists of forward and rearward transverse panels 27 and 28 connected at the ends to the A posts and interconnected at the top by the channel-shaped connecting member 29. Connection to the A posts is through the rigid joinder of the inward projections 49, Fig. 10, on the posts with the bottom wall of the channel member 29.

The channel-shaped lower portions of the A posts are formed at their rear outer edges with rabbets 30 to receive the door overlaps, and the rear side edges of the cowl panel are wrapped around the bottoms and rear side walls of the channels, and made to conform to the rabbeted section of the posts, as clearly appears in Fig. 7, and firmly secured to the posts as by welding. The bottoms of the A posts are extended downwardly so as to overlap the sides of the main body side sills to a substantial degree when the cowl unit is assembled therewith and the side walls of the posts are formed in their overlapping portions with lateral flanges or tabs 31 whereby they may be rigidly secured, as by riveting or welding, to the main body side sills.

Also forming a part of the unitary cowl sub-assembly is the baffle plate 32 having the vertically extending arm 33, the upper forwardly turned and beaded edge of which projects above the upper edge of the header 12, and the lower forwardly extending arm 34, the forward end of which makes a sliding fit joint with instrument board 35 which is removable with a motor assembly unit presently to be described. The baffle plate 32 is supported intermediate its ends from the header 12 by spaced angle brackets 36, and at its ends by connection with the A posts. Pressed metal angle brackets 37, which may or may not be downward extensions of the ends of the baffle plate 32, have their outer rearwardly extending arms secured to the inner face of the A posts, as by screws, and have their inwardly extending arms arranged, when the parts are assembled, substantially in the plane of the instrument board 116, see Fig. 8, and flanged forwardly at 38, to provide a means for securing the correspondingly flanged ends of the instrument board thereto, if desired. In the drawings, I have shown anti-rattling and joint finishing trim 39 introduced in the joints between the instrument board 35 and baffle plate 32 and brackets 37, as well as between the brackets 37 and the A posts.

The side sub-assembled units E are identically constructed with the exception that they are lefts and rights, and the description of one of these units will, therefore, suffice. Each unit sub-assembly E consists of two main parts, the C—D post 40 and the top rail 41, joined thereto and extending when assembled in the body, from the A post to the E post at the rear edge of the rear quarter window opening of the tonneau. By reference to Figs. 3, 16, 17, 18 and 19ª, it will be seen that the B—C post is of generally inwardly presenting channel section throughout its length, but that the particular section thereof varies at different points in its length. At its lower end, which like the A post, when the parts are assembled in the body, overlaps the outside surface of the main body side sill to a considerable extent, the sides of the channel are flanged outwardly to provide tabs 42 through which the post is rigidly secured to the body sill, as by riveting or otherwise. From this extreme lower portion of the post to the belt line the channel is deepened and is rabbeted on both its outside corners, as at 43, to receive correspondingly sectioned door rails of the adjacent edges of the doors. Above the belt line, to obtain a maximum range of vision without undue sacrifice of strength, the post is of decreased width, both fore and aft and transversely of the body, and is of simple channel section, as is clearly shown in Figs. 3, 16 and 19ª.

The top rail 41 is of generally inwardly presenting channel section, as shown in Figs. 10, 14 and 28, and thus provides the exterior surface of the body between the door openings and the rear quarter windows opening and the roof structure. Its lower side wall extends horizontally and is provided with a downwardly extending flange 44 forming a door stop above the door openings. The upper end of the B—C post is received within the angle formed by this flange 44 and the lower side wall of the channel shaped top rail. A U-shaped bracket 45 has its sides welded to the sides of the channel-shaped post, its bight lying against the lower side wall of the top rail and is secured to said top rail, by riveting, as shown. Further security in this joint is obtained by laying an angle reinforce 46 within channel shaped top rail, as shown in Fig. 14. If desired, the post may be additionally secured by welding it to the top rail. The upper channel side of the top rail is inclined upwardly and inwardly for a portion of its width and is then flanged upwardly at 47, thereby providing an upwardly and outwardly presenting seat to receive the edge portion of the roof structure.

The final assembly joint between the top rail and the A post is effected by the rigid joinder of a rearward extension 48 on the A post with the bottom side flange of the top rail, see Figs. 9 and 10.

At the top of the D post the joint between th top rail and post is substantially the same as at the top of the B—C post (compare Figs. 20 and 21 and Figs. 14 and 15) and the rear end of the top rail is secured in any suitable manner, in the final assembly, to the top of the E post. Above the rear quarter window opening the lower flange of the top rail 41 is given a shape to provide a rabbet to receive the rear quarter window and to this end, it is formed with a downwardly extending flange 49 which is bent back upon itself some distance and then formed with an inwardly extending flange 50, see Fig. 28.

The tonneau unitary sub-assembly comprises the tonneau paneling, designated generally by the numeral 51, and the internal framework to which the paneling is applied and secured consisting of the tonneau side sub-sills 52, the rear cross sill 52′, the D posts 53 at the forward edge of the tonneau paneling, the E post 54 rising from the crown of the wheel housing and extending along the rear edge of the rear quarter window to the top rail, the reinforcing member 55 extending from E post to E post and the tire carrier supporting brace 56.

The side sub-sills 52 are of angle cross section and are given the curved contour of the upper portion of the main body side sills S and rest thereon from end to end. The paneling 51 at the sides and rear is provided with an inturned flange 57 which is lapped under the side sub-sills 52 and the rear sill 52' interconnecting the side sub-sills, see Fig. 26. At the front the side sub-sill is preferably secured to the adjacent D post 53 by having its vertical arm offset inwardly and secured to a rearwardly extending flange 58 provided at the lower wheel housing section of the D post.

The D-post 53 is throughout its length of substantially inwardly presenting channel section and has its lower portion curved to conform to the curvature of the wheel housing. Only this curved lower portion is provided with the rearwardly extending flange 58. Like the A and B—C posts the D post is projected downwardly so as to overlap the side of the main body sill S to a substantial degree, and it is rigidly secured thereto in the final assembly by riveting the lower end of the rearwardly projecting flange 58 and a tab or flange 59 projecting forwardly from the forward channel wall to the main body side sill as shown in Figs. 4 and 24. Along its outside forward edge, the portion of the post below the belt line is formed with a rabbet 60 adapted to receive the door overlap. From the curved portion of the post upwardly the edge of paneling 51 is wrapped around the D post so as to engage its outside and forward faces and is secured thereto as by welding. The paneling is rabbeted to correspond to the rabbet 60 of the post. Along the curved lower portion of the post 53 the panel forming the wheel housing is not wrapped around the post at its forward edge but merely overlaps and is secured to the rearwardly extending flange 58 of the post.

Above the belt line the channel of the post is quite shallow, see Fig. 22, corresponding in depth to the depth of the corresponding portion of the B—C post, the lower portion of the post being offset both on its outer and inner sides to provide this construction in a manner similar to the showing in Fig. 19ª of the B—C post. At its rear edge the bottom wall of the post is slightly offset inwardly and is bent back upon itself as shown at 61 and then flanged inwardly at 62 to provide a rabbet to receive the forward edge of the rear quarter window. The top of the D post is secured to the top rail in the final assembly of the parts in the manner clearly disclosed in Figs. 20 and 21 by means of a U-shaped bracket 63 and the reinforcing angle member 64, similar to the connection between the top rail and the B—C post.

The E post 54 is of the double angle section shown in Fig. 25 and is secured at the top by a suitable bracket not shown to the top rail 41 and at the bottom by an angle bracket 65 to the crown of the wheel housing. The tonneau paneling 51 is wrapped around the outer angle of the double angle post and is then extended forwardly and bent back upon itself at 66, and finally flanged inwardly at 67 to provide the rabbet to receive the rear edge of the rear quarter window. The flange 67 of the panel is secured, as by welding, to the inner arm of the post.

At the bottom of the rear quarter window opening, the paneling 51 is flanged inwardly and downwardly, see Figs. 3 and 26. At the rear the paneling 51 is flanged inwardly at 68 around the rear window opening and provided with a rabbet to receive the rear window. At the bottom this flanged in portion 68 is secured to the reinforcing angle member 55 adapted to receive the upper edges of the rear seat back upholstery. The brace 56 adapted to form a support for the tire carrier is secured at the top to said member 55 and at the bottom it is formed with a forward flange and is nested within and secured to the rear sill 52'.

The upper portion of the tonneau panel 51 is arched forwardly to form a part of the roof. The forward edge of this arched over portion is bent back upon itself and then flanged downwardly to provide a seat adapting it to be readily and neatly joined to the rear edge of the roof unit subassembly, diagrammatically shown at R in Fig. 1.

Thus far has been described the body superstructure formed in unitary sub-assemblies in the main out of sheet metal stampings of relatively light gauge, and the manner in which these are joined to each other and to the main body side sills. It remains now to describe the structure of the underframe U including the main side sills S and interconnecting cross braces, and the associated parts. These too are of relatively light gauge pressed metal. They may or may not possess an inherent rigidity in and of themselves. The criterion of their construction is that they are made of pressed metal of a gauge as light as possible consistent with the superstructure and other units and of the necessary strength, flexibility and durability. The term "flexibility" is relative since there must be sufficient interbracing of the parts to attain the stiffness requisite for strength.

The standard pressed metal body of which the superstructure of the present invention is in form derived at present includes a skeleton framework covered by a paneling of sheet metal and this framework of itself embodies main body side sills of relatively light gauge pressed metal. These sills, however, are of relatively shallow depth and are of an extent not much greater than the span of the doorways of the vehicle. These sills are commonly connected by cross braces which are, like the sills, relatively shallow in depth, confined substantially to the plane of the floor of the car and, in common with the sills, are provided with flanges to support the floor. Such sills and inter-connecting cross braces constitute the underframe of the integral pressed metal body as it is known today. The corresponding underframe U of this new body of my invention being designed to serve not only as body underframe but also as a chassis, differs in a number of important respects from this known type of construction and will now be described in detail.

While this underframe or chassis U is, in one form of my invention as herein described, combined with a body superstructure at the plant of the body manufacturer, in a manner to form therewith a complete body structure having also the functions of a chassis, it is to be understood that I may construct this underframe, and this is within the scope of my invention, as a separate article of manufacture, and in like manner also construct the entire body superstructure as a separate article of manufacture and bring them together only in the final assembly. In such case, the underframe may be considered to be a chassis incorporating as elements thereof various elements of the usual body structures, namely, the cross braces forming seat supports and the body flooring, and may be assembled with the motor unit to be presently described on the chassis line, before the assembly of the body superstructure therewith. While the underframe will be hereinafter described, from the standpoint of its use as a body underframe, it will be understood that I also consider the various features thereof of great utility as a chassis construction, and that the structure incorporated therein is obviously useful in connection with other types of body superstructures than one approximating in form the standard pressed metal body in common use at the time of this invention.

The main body side sills S forming the main elements of the new body underframe are of generally inwardly presenting channel form throughout their length, the upper and lower side walls being designated, respectively, by numerals 69 and 70 and the vertical web by numeral 71. In the vicinity of the thresholds of the doors and for some distance therebeyond in each direction, they have a very deep web portion 71 equal substantially to one half the distance from the threshold to the ground line of the vehicle, as is evident from the showing in Fig. 1. Also the sills extend both rearwardly and forwardly a substantial distance beyond the body superstructure erected thereon in the manner already described. The deepened web is carried forwardly a substantial distance further than rearwardly of the doorway openings, as greater strength is desired in the relatively longer forward extension in the immediate vicinity of the region supporting the motor. This deepened sill construction permits a correspondingly rigid cross bracing construction and affords ample space to conveniently provide for the carrying of the various automotive organs by the underframe including these sills and cross braces.

In the plan view, Fig. 5, it will be seen that the side sills S run parallel and are spaced apart a minimum distance from their extreme front ends to a point substantially coincident with the front of the cowl and from there they diverge to approximately the points of connection of the B—C posts from which point they run in almost parallel relation to approximately the points of connection of the D posts, from which point they converge to their extreme rear ends. In side elevation, the portions of the sills from the D post rearwardly are arched upwardly to allow ample clearance for the movements of the rear axle X. At the front the lower edges of the sills are similarly arched upwardly for a like purpose as respects the front axle Y.

From the foregoing description it will be seen that the portions of the sills which are coextensive longitudinally with the body superstructure are given substantially the contour lines of the bottom edge of the body superstructure, but are inwardly offset from said bottom edge from approximately the front of the cowl to the D post, and serve as a splash board in this region extending from the threshold line of the body superstructure to the running board. In their rear portions, in the vicinity of the wheel housings, the outside walls of the side sills are in effect, see Fig. 26, downward extensions of the outer surface of the tonneau panelings 51 forming therewith the wheel housings. The upper flanges 69 of the body side sills S are substantially Z shaped in cross section from a point within the cowl rearwardly to the vicinity of the D post, thereby providing an inwardly and upwardly presenting seat to receive the ends of the floor boards, and also the ends of certain cross members presently to be described.

It will be noted that the end portions of the sills taper in a vertical plane almost to a point, and in order to compensate in some measure for the decrease in strength due to the diminished height of the end portions of the web 71 of the sills, I may increase the width of the flanges 69 and 70 adjacent the ends. In the present embodiment of my invention, I find it sufficient to widen only the upper flanges of the forward extensions, as shown at 72. The portion of greatest width is approximately at the point of connection of the foremost cross brace 73 forming an element of the motor support. As shown in Fig. 5, the flange 69 tapers from this point of greatest width to its normal width at the extreme forward end of the sill. From a point some distance forward of the forward edge of the cowl to the cross brace 73 directly under the radiator 74 the upper flange 69 is formed with an upwardly offset shoulder 75, see Figs. 5 and 36, extending from the outside of the sill to the inside of the widest part of the flange and forming a shoulder against which the movable side of the hood H is adapted to abut. To extend the lines of this shoulder 75 rearwardly to the plane of the forward edge of the cowl an angle plate 75', having a downturned flange along the outer edge of its horizontal arm, which flange is in continuation of the shoulder 75, is secured by its horizontal flange to the top of the sill and by its vertical flange to the forward edge of the cowl, see Figs. 2 and 13.

The numerous cross braces between the sides of the body side sills S forming supports for the various automotive organs, floor boards and seat structures will now be described, with special reference to Fig. 5 and the sectional views appearing on the same sheet of the drawings. The foremost cross brace 73 which has already been referred to above and the next cross brace 76 are both designed not only to interconnect and interbrace the side sills S but also to serve as the supports for the motor unit and form parts of the motor unit assembly presently to be described more in detail. The third cross brace 77 is of inverted channel shape and has laterally extending flanges which rest on and are secured to the downwardly offset portion of the inturned flanges 69 at the top of the body side sills. At its ends the cross brace 77 is, in effect, carried down to the full depth of the side sills S by the provision of a bracing stamping 78 at each end thereof. These stampings are of generally triangular shape, with the inner corners left off, as shown in Fig. 39, and the top, and bottom edges thereof are flanged and secured as by riveting or welding at top and bottom, respectively, to the forward flange of the cross brace channel 77 and the top flange 69 of the body side sill, and to the bottom flange 70 of the side sill.

In addition to its function of strongly reinforcing the end of the cross brace channel 77 at its point of connection to the sill, the right hand stamping 78 serves, with a corresponding stamping 79 arranged forwardly thereof, see Figs. 5 and 38, to support the battery B. To this end, both the stampings 78 and 79 are formed, on their sides adjacent each other with upwardly facing shoulders, as 80, upon which the battery is adapted to rest. The rear flange of the cross brace channel 77 cooperates with an angular cross brace 81 also secured to the downwardly offset portions of the upper flanges 69 of the body side sills, to support the front seat structure.

The front seat structure comprises a lower seat pan 82 having its outwardly flanged edges resting on and rigidly secured to the flanges 69 of the body side sills and the cross braces 77 and 81. Upon these outwardly flanged edges is supported the seat support 82ª, in this case a box shaped structure of sheet metal having its sides inwardly flanged at top and bottom, the bottom flanges being rigidly secured to the outwardly extending edge flanges of the seat pan and the top flanges supporting and being secured to the seat structure including the seat pan 83, seat back panel 84, garnish rail 85 and cushion retainer 86. From the foregoing description, it will be seen that the front seat supporting structure serves also as transverse and longitudinal bracing means between the sides of the body structure.

A further cross bracing member 87 of inverted channel form similar to the cross bracing channel 77 interconnects the body side sills just forwardly of the D posts. This channel member is, however, additionally reinforced and strengthened by flanging the outer edges of the laterally extending flanges upwardly, as shown in Fig. 43. The ends of this inverted channel member are connected to the side sills by slightly offsetting the bottom of the channel downwardly and securing it, as by welding, to the bottoms of the upper sill flanges 69, see Fig. 40. Stampings 88 generally similar to the reinforcing and bracing stamping 78 extend the ends of the channel cross brace 87 vertically downward substantially the full depth of the side sills. At the top these stampings are of channel form, the channel nesting and being secured within the channel of the cross brace. At the bottom they are provided with a wide forwardly extending flange 89 for securement to the bottom flange 70 of the body side sills. The vertical web of stampings 88 and the wide horizontal flange 89 serves also further purposes presently to be described.

To the rear of the D posts, the body side sills are further interconnected and interbraced by the vertically extending heel board stamping 90 and the irregularly shaped downwardly open but upwardly closed stamping 91 arranged at the rear edge of the body superstructure.

At its lower portion the vertical body of the heel board is flanged forwardly in the horizontal plane of the downwardly offset portion of the upper flanges 69 of the side sills, whereby to form a shoulder 92 to serve as a floor board support. From this shoulder the heel board stamping is extended downwardly until it meets the lower sill flanges 70 when it is further extended by a flange which lies against and is secured, as by welding, to the lower sill flanges.

The upper edge of the body of the heel board is flanged rearwardly at 93 to provide a support for the forward edge of the seat pan 94. The heel board is further secured to the webs 71 of the body side sills by the flanges 95 at the ends of the vertical body of the heel board rigidly secured to the adjacent sill.

In the horizontal plane of the upper edge of the heel board, the irregular stamping 91 is formed with a horizontal shoulder 96 for supporting the rear edge of the seat pan. This stamping is flanged at its forward and rear edges for securement to the lower flange 70 of the body side sills and has its ends intermediate said edges lying against and secured to the top flanges 69 of the body side sills through a substantial distance rearwardly from the region of the rear bottom edge of the tonneau superstructure. To provide more room for the reception of the gasoline tank, the flange along the rear edge of said stamping is offset as at 97 from the ends of the flange which are secured to the bottom flanges 69 of the sills. Thus the stamping 61 serves, in addition to its function of cross connecting and interbracing the sills, as a rear seat support and a cover for the gasoline tank (not shown).

The seat pan 94 is supported at its sides from the body side sills, and to this end it is provided at its lateral edges with upwardly extending flanges 98 which are flanged outwardly along their upper edges at 99, these flanges 99 resting on and being secured to the tonneau side sub-sills 52, see Fig. 26.

The running boards are supported from the body side sills and cross braces by three pairs of cantilever brackets 101, the rear pair of brackets being arranged substantially in the transverse plane of the cross brace structure 87, 88, the intermediate pair, in the transverse plane of the cross brace structure 77, 78 and the forward pair, substantially in the plane of the cross brace 76. These cantilever brackets are generally of flanged channel section, the channels decreasing in depth toward their outer ends. They are in each case secured to the lower flanges 70 of the side sills by bolts which extend through the flanges of the brackets, the inner edges of the running boards which extend between the brackets and the lower flanges of the sills, and the lower flanges themselves of the side sills. Inwardly of this connection, the brackets are, in each instance offset upwardly and secured as by riveting or otherwise, to the cross brace structures. In the case of the rear brackets, this connection is to the flanges 89 of the stampings 88, in the case of the intermediate brackets, to the bottom flanges of the stampings 78 and in the case of the forward brackets, to the rearwardly extending flanges 102, Fig. 42, of the brackets 103 of the cross brace 76.

An important feature of my invention resides in the construction which permits the motor and transmission and the motor controls, including elements ordinarily forming parts of the cowl structure, such as the instrument board, to be assembled as an independent, unitary sub-assembly which can readily be assembled with and disassembled from the rest of its body structure.

To this end, the forward cross brace 73, which is of rearwardly presenting channel section having a substantially deeper web centrally than at the ends, and having a central bearing 104 adapted to receive a trunnion (not shown) on the forward end of the motor unit, has its ends connected to the side sills in a manner to permit their ready connection to or release therefrom. This connection comprises an angle bracket 105 having a long arm and a short arm, the long arm being rigidly secured, as by riveting, to the front face of the channeled cross brace and the short arm extending forwardly and being provided with a tapped hole. At the point of connection of the cross brace the lower flange 69 of the sill is extended inwardly by a flat plate 106 rigidly secured thereto. The inner edge of this plate extends under the end of the channel member of the cross brace and is stiffened against downward bending or distortion by a U-shaped brace 107 secured to it and to the widened upper flange 69 of the sill. This inwardly extending bracket and its brace serve at all times to support the end of the sill and permit the screw bolt 108, which extends through the web of the crossbrace 73 and through the brace 107 and a spacing sleeve 108' and screws into the tapped hole in the bracket 105, to be readily operated to lock the end of the cross brace to the sill.

Figure 2A:
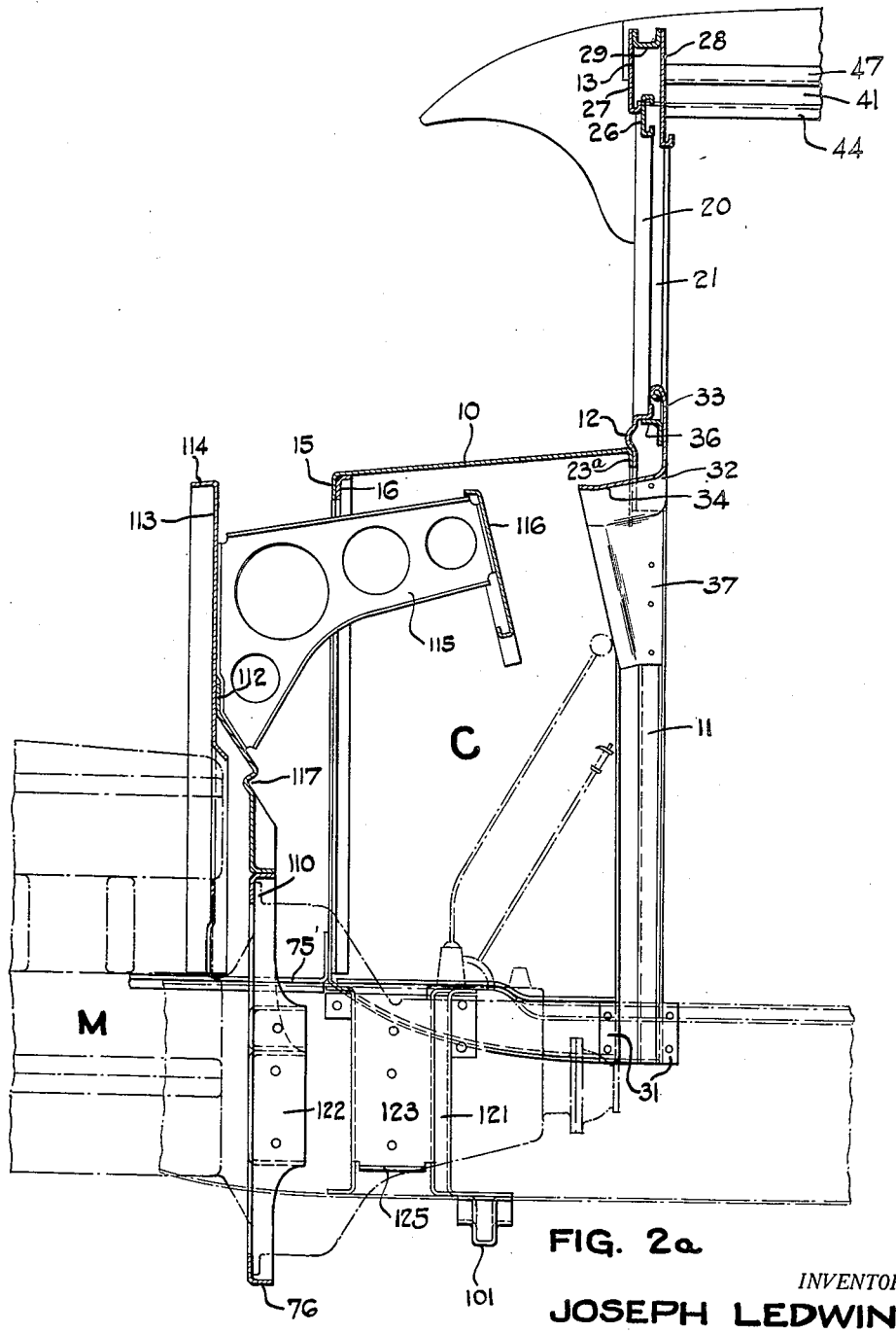
Fig. 2a is a similar view showing the motor sub-assembly unit slightly displaced from its assembled relation with the adjacent portions of the body.

The rear cross brace and support 76 for the motor unit comprises, like the forward cross brace and support 73, a rearwardly presenting channel-section element 109, the greater portion of which has a very wide web which has a large central opening 110 to receive the transmission casing of the motor unit M indicated diagrammatically in Fig. 2a. The transmission casing is provided with a flange 110 which is secured by any suitable means, such as bolts, not shown, to the element 109. The motor unit itself thus forms an element of the transverse cross bracing structure of the body underframe. To further strengthen the transverse bracing structure at this point and to form a support for the instrument board and shroud pan, the element 109 is extended upwardly by a stamping 111 having its lower and side edges flanged rearwardly, the lower flange thereof mating the upper flange of the element 109 and being rigidly secured thereto as by welding. The upper portion of this stamping 109 is inclined forwardly and then flanged vertically at 112. Secured to this vertical flange 112 is the shroud pan 113 which is provided with a flange 114 around its top and side edges which is offset inwardly to a slight degree from the plane of the cowl panel 10 to provide a rabbet to receive the rear edge of the hood.

A pair of laterally spaced brackets 115 flanged at their edges to provide stiffness and strength and means for readily securing them, are secured by the flanges at their forward edges to the inclined portion of the stamping 111 and to the shroud pan 113 and support on their rear downwardly inclined flanged edge, the instrument board 116. The instrument board comprises a stamping flanged forwardly at its top and side edges to abut, respectively, the mating surfaces of the baffle plate, 32, and angle member 37 as hereinbefore described. If desired, these mating flanges may be secured together by readily removable means, such as bolts, (not shown).

The stamping 111 is formed with a step 117 to receive the forward edge of the rearwardly inclined toe board (not shown) and at the sides the toe board is supported by toe board support stampings 118 which are each provided along their inner edges with a downwardly offset flange 116 in the plane of the step 117 to receive the side edges of the toe board. These toe board supports 118 are relatively wide and form side extensions of the removable toe boards. They are preferably removably secured through flanges 118 at their upper ends to the shroud pan 113 and at their lower ends by vertically offset flanges 119 and 120 (Figs. 2 and 12) to the vertically offset portions of the upper flanges 69 of the side sills. The securing means may comprise bolts (not shown). In some cases it is feasible to have the toe boards form parts of the motor unit assembly to be removable therewith.

It will be noted that the lateral vertically aligned flanges of the cross brace and motor support stampings 109, 111, are widened to provide strength and wide bearing surfaces 122 where they are secured to the sills, and that bracket stampings 121 shown in Figs. 2, 2a, 5, 37 and 42 rigidly secured to the upper and lower flanges of the sills and to the webs thereof as by riveting, have mating surfaces 123 opposed to the bearing surfaces 122, and these opposed surfaces are rigidly secured together by bolts extending through the flanges 122 and the bracket stampings 121. The brackets 121 may be reinforced as shown by stampings 124 nesting within the brackets as shown in Fig. 42 and the ends of cross connecting stampings 109, 111 are supported at all times by shoulders 125 formed in the lower portions of the brackets 121. These shoulders take the weight off the securing bolts so that they may readily be removed or put in place.

From the foregoing description it will be seen that when the bolts connecting the cross brace stampings 73, and 109 and 111 are removed, the transmission shaft disconnected, and a few other minor connections broken, the entire motor unit may be forwardly removed as indicated in Fig. 2a. By this construction the entire motor unit may be readily removed from the body structure for replacement or repair, and what is more important still, the motor unit may be assembled complete on the motor line and tested on the testing block with practically all the essential controls directly associated therewith, and then meet the otherwise completely painted and upholstered body on the body line and be assembled as a unit therein, thus shortening and simplifying the processes of manufacture.

The front axle Y of my improved vehicle structure is sprung from the forward extensions of the sills directly in the plane thereof as is clearly shown in Figs. 1 and 35, the forward ends of the springs being pivoted directly to the forward ends of the sills and the rear ends being pivoted to shackles which are, in turn, pivoted to the sills.

The rear axle X is sprung from the rear ends of the sills in planes inside the vertical planes of the sills by reason of the fact that the sills converge at their rear ends and the springs are preferably extended in planes parallel to the center line of the vehicle. The rear ends of the springs are suspended from the ends of the sills by shackles, while the forward ends are pivoted to the cross brace structure 87, 88 through channel shaped brackets 126 secured, as shown in Figs. 40 and 43, to the vertical web of the reinforcing bracket 88 for the cross brace 87.

In Figs. 31 to 34, I have shown a modified construction in the region of the post D which I may employ in some cases. I have there shown a bracket member 127 for anchoring the lower portion of the D post 128 of inwardly presenting channel form to the tonneau sub-sill 129 and to the main body side sill S'. The body side sill is also of somewhat different form from that shown in the form heretofore described, and the D post is located closer to the "kick-up" of the sill. The rear seat heel board 130 does not rest upon the bottom flange of the sill but is secured both in its vertical and its horizontally extending portions by laterally extending flanges 131, 132 to the webs of the sills. The horizontal portion of the heel board forms a part of the tonneau floor and is provided at its forward edge with a downwardly offset flange to provide a forwardly and upwardly presenting angle to receive the rear edge of the floor board. The floor board is supported at the sides by stampings 133 Z shaped in cross section, see Fig. 34, the lower inwardly extending flanges of which are substantially in the plane of the downwardly offset flange at the forward edge of the horizontal portion of the heel board and the upper flange conforms to the upper flange of the sill, see Fig. 31, and is secured thereto as by welding.

By referring to Figs. 1, 2 and 2a, it will be noted that the upper threshold portions of the vertically deepened sills are downwardly offset with respect to the tops of the forward and rearward extensions. This lowering of the threshold of the sills permits a corresponding reduction in the over all height of the vehicle embodying my invention, yet allows the motor and other automotive organs to be supported at a height above the ground to provide ample ground clearance of these parts.

I am aware that the particular embodiment of my invention, which I have described herein, is susceptible of considerable variation without departing from the spirit of my invention and hence, I claim my invention broadly, as indicated in the appended claims.

What I claim is:

1. A pressed metal underframe for an automotive vehicle comprising main side sills interconnected by cross braces, which sills have their rear ends deflected inwardly and are adapted in their inward positions to have vehicle wheels directly sprung therefrom, and means projected inwardly of the side sills and secured thereto to support the forward ends of the springs, whereby the springs may be arranged in vertical planes parallel to the longitudinal axis of the underframe.

2. A pressed metal vehicle body structure comprised of a superstructure including doorways, longitudinally extending main body side sills upon which said superstructure is founded, the said main body side sills being extended forwardly and rearwardly of the doorways, being of inwardly presenting channel cross section throughout and of relatively great vertical depth in the region of the doorways, body cross braces relatively shallow throughout the greater portion of their length but having deepened ends interbracing the said walls of the deepened channel section of the main body side sills, and means on the main bodies and on the extended ends of the main body side sills to support the various organs of an automotive vehicle whereby the body serves as its own chassis.

3. A pressed metal automobile body structure comprised of a body superstructure including doorways, longitudinally extending main body side sills upon which the superstructure is founded having those portions in the regions of the doorways greatly deepened vertically, and relatively shallow sill cross braces interconnecting the tops of the sills and having vertically deepened ends cross bracing the walls of the deepened sill portions, and the superstructure having portions overlapping vertically and secured to the upper portions of the deepened sills, the sills being extended forwardly and rearwardly of the doorways, and provided with means on their main bodies, and on their extended ends to support the various organs of an automotive vehicle.

4. A pressed metal automobile body structure comprised of a superstructure including doorways, longitudinally extending main body side sills upon which said superstructure is founded, which main body side sills are extended forwardly and rearwardly of the doorways and forwardly beyond the superstructure, are of inwardly presenting channel cross section throughout, of relatively great vertical depth in the region of the doorways and of less depth in their extended ends and have a bottom flange of substantially uniform width and a top flange of varying width widest at the forward end of the sill, together with means on the main bodies and on the extended ends of the sills to support the various organs of an automotive vehicle, whereby the body serves as its own chassis.

5. A pressed metal automobile body structure comprised of a body superstructure including doorways, longitudinally extending main body side sills upon which said superstructure is founded, said main body side sills being extended forwardly and rearwardly of the doorways, and being of channel cross section presenting inwardly throughout, relatively shallow body cross braces in the plane of the threshold having vertical deepened ends interbracing the opposite sills and the tops and bottoms of the deepened sections, the superstructure being provided with portions which overlap the main body side sills vertically on the exterior to further interbrace the sills and individually stiffen them, and means carried by the sills on both their deepened and extended portions to support the various organs of an automotive vehicle.

6. A pressed metal automobile body structure comprised of a skeleton framework and sheet metal paneling secured thereon, said framework embodying a body underframe lying substantially in the plane of the thresholds of the body and embodying main body side sills the tops of which are fashioned to support the floor boards of the body and sill cross braces of a depth substantially equal to the depth of the threshold and likewise fashioned to support the floor boards of the body, the tops of the sills and the cross braces lying substantially in the same horizontal plane, a forward extension from said main body side sills the top of which lies substantially in the same plane, a rearward extension in a different plane the top of which merges unbrokenly into the top of the threshold portion, a cowl structure founded on the extended fore portion of said sill and a tonneau structure having its main body longitudinally secured to the rearward extension of the sill, each of said structures embodying vertically extending posts the bottoms of which overlap exteriorly the sides of the sill and are secured thereto.

7. A pressed metal automobile body structure comprised of a skeleton framework and sheet metal paneling secured thereon, said framework embodying a body underframe lying substantially in the plane of the thresholds of the body and embodying main body side sills the tops of which are fashioned to support the floor boards of the body and sill cross braces of a depth substantially equal to the depth of the threshold and likewise fashioned to support the floor boards of the body, the tops of the sills and the cross braces lying substantially in the same horizontal plane, a forward extension from said main body side sills the top of which lies substantially in the same plane, a rearward extension in a different plane the top of which merges unbrokenly into the top of the threshold portion, a cowl structure founded on the extended fore portion of said sills and a tonneau structure having its main body longituidnally secured to the rearward extension of the sill, each of said structures embodying vertically extending posts the bottoms of which overlap exteriorly the sides of the sill and are secured thereto, the threshold portions of the sill being deepened and the extended end portions bowed upwardly from the bottom of the deepened portion and merging unbrokenly thereinto.

8. A pressed metal underframe for automotive vehicles comprising side sills interconnected by cross braces said side sills having their rear ends deflected inwardly and being adapted in their inward positions to have vehicle wheels directly sprung therefrom, and means adapting the cross braces to receive the forward ends of springs so used, said side sills having their front ends substantially rectilinear and being adapted at their extremities and on their under sides to have vehicle wheels sprung therefrom in substantially the same vertical plane as the sills.

9. A pressed metal underframe for automotive vehicles comprising side sills interconnected by cross braces which side sills have their rear ends deflected inwardly and adapted in their inward positions to have vehicle wheels directly sprung therefrom, means adapting the cross braces to receive the forward ends of springs so used, said side sills having their front ends substantially rectilinear and adapted at their extremities and on their under sides to have vehicle wheels sprung therefrom in substantially the same vertical plane as the sills, and a pressed metal body superstructure founded on said side sills.

10. A pressed metal underframe comprising side sills of relatively light gauge metal having threshold portions of relatively great vertical depth and extended ends of relatively less depth having tops, respectively, substantially in and above the plane of the top of the threshold portions and bottoms bowed upwardly from the under side of said deepened threshold portions, body cross braces of relatively shallow vertical depth interconnecting the upper zones of the side sills and provided with relatively deep end portions interbracing the top and bottom of the vertically deep sill portions, floor board supporting flanges on sills and cross braces substantially in the plane of their tops, and relatively widened flanges on the extended fore ends of the sills adapting them for the cantilever support of the front wheels, together with means to spring the rear wheels in vertical planes inwardly removed from the rear portions of the sills.

11. A pressed metal vehicle construction comprising side sills of relatively deep vertical cross section in their main bodies, cross braces substantially in the plane of the tops of the sills and of relatively shallow cross section having vertically deepened ends interbracing the tops and bottoms of the vertically deepened portions of the sills, and cantilever supports for a running board connected with the vertically deepened ends of the cross braces.

12. A pressed metal vehicle construction comprising side sills of relatively deep vertical cross section in their main bodies, cross braces having their entire top edges substantially in the planes of the tops of the sills and of relatively shallow cross section throughout the greater portion of their length and having vertically deepened ends interbracing the tops and bottoms of the vertically deepened portions of the sills.

13. A pressed metal vehicle construction comprising side sills of relatively deep inwardly presenting channel form adapted to form a splashboard, cross braces of relatively shallow cross section but deepened at their ends to interbrace the top and bottom flanges of the sills, and cantilever running board supports connected to said deepened ends of the cross members, and offset downwardly in their outer portions to permit the running board to be received between this offset portion of the supports and the bottom of the sills and deepened ends of the cross braces.

14. In a vehicle construction a pressed metal main body side sill of angle cross section presenting inwardly and downwardly having its front and rear ends adapted to receive respectively, front and rear vehicle axles directly sprung therefrom, strengthened at its front end by a forwardly widened extension of the inwardly projecting flange, and having the inner edge of said forwardly widened extension upwardly turned.

15. A pressed metal automobile structure comprising a cowl unit and a main side sill of relatively deep cross section to which said cowl unit is anchored throughout its length, said cowl unit embodying a cowl unit sub-sill of Z cross section having one branch connected with the top of the main side sill and overlapping the side thereof, and the other branch supporting the cowl panel in depended relation to the top of the sill.

16. A pressed metal automobile structure comprising a rear body superstructure unit and a main side sill of relatively deep cross section to which said superstructure unit is anchored, the side sill having a top of unbroken contour upon which the body of the unit is seated, and the unit having a skeleton framework a portion of which downwardly overlaps the side of said main side sill.

17. A pressed metal automobile structure comprising a tonneau unit and an underframe side sill, said tonneau unit embodying a vertically extending body post structure vertically overlapping and directly secured to the side sill, and having its main body seated on the top of the side sill throughout the length of the tonneau.

18. In a vehicle construction, in combination, a side sill having a threshold portion of channel cross section, exteriorly and interiorly presenting angle members lapped commonly respectively over the outside and inside walls of the channel of the sill and constituting the one an anchorage for a cowl and the other a floor board support.

19. A pressed metal vehicle body comprising a top rail of channel cross section having a bottom wall outermost and a vehicle body post connected with the lower side wall together with an angle member nested in the lower angle of the channel cross section and a U-shaped member nested in the upper end of the post section interconnected together through the wall of the channel section of the top rail.

20. In a pressed metal vehicle body the combination of a main body side sill having a laterally extending portion at the top, a tonneau panel seating directly upon the top of the sill, a tonneau side sub sill overlying the tonneau panel and body side sill, and a tonneau seat bottom pan depended from the tonneau sub sill by means of an outturned flange extending from one of the side walls of the pan.

21. In a pressed metal body, a body post having a rabbeted wall forming a part of a window frame and a panel conformed to said rabbeted wall and containing a portion bent upon itself in the plane of the rabbet forming a part of the glass run channel.

22. In a pressed metal vehicle body, a top rail of angle cross section having a vertically extending outer branch and a horizontally extending lower and inner branch which latter branch is downwardly flanged and provided in the body of the flange with a portion bent upon itself forming a part of a glass run channel.

23. A pressed metal vehicle body top rail of angle cross section having one branch constituting the exterior face of the rail and another branch an inwardly extending bottom of the rail which latter branch in the region of the doorway is provided with a downturned flange of determinate width constituting an overlap for the upper edge of the door, and in an adjoining region with a wider flange in which is formed a portion of a glass run channel.

24. In a pressed metal vehicle construction, side sills of inwardly presenting channel cross section and a transversely U-shaped seat pan in a plane intermediate the top and bottom of the sill having upturned side portions anchored to the top of the sill, and seat supports under the front and rear ends of the seat pan founded on the bottom flange of the channel sill.

25. In a pressed metal vehicle body, main body side sills of inwardly presenting channel cross section, and a cross brace intermediate the bottom and top walls of the sills, and a seat pan having its rear edge supported by said cross brace intermediate the top and bottom thereof by means of a ledge impressed therein.

26. In a pressed metal vehicle construction, an underframe comprising side sills vertically of deepened section in the threshold sections thereof, and a body superstructure erected on said sills including doorways, the tops of the sills being downwardly offset in their threshold sections, whereby the over all height of the vehicle is lowered without decreasing the height of the doorway openings.

27. In a vehicle construction, an underframe embodying side sills serving as chassis sills interconnected by cross members, said cross members and sills directly supporting the body flooring and seat structures, and a substantially floorless body superstructure overlapping the sides of the sills from a point adjacent the front of the cowl to a point adjacent the front of the wheel housing and the tops of the sills through portions of the wheel housing regions.

28. A pressed metal vehicle construction comprising an underframe having a single set of side sills and cross braces from which the wheels are directly sprung, and from which the body flooring and seats are directly supported, and a closed body superstructure having portions overlapping and secured directly and rigidly without any intermediate cross or longitudinal members to the tops and outer sides of said sills.

29. An underframe for vehicles comprising side sills having vertically deep portions intermediate their ends and a shallow cross brace interconnecting the tops of the sills in said region, the ends of said cross brace being reinforced by a vertically deepened gusset plate, which gusset plate is formed in its upper portion with a shoulder providing a support for one of the automatic organs of the vehicle.

30. An underframe for vehicles comprising side sills connected by a cross brace having deepened end portions of substantially the vertical depth of the sills, rearwardly presenting channel members secured to the deepened end portions of said cross brace and strengthening them, the side walls of said channels serving as spring suspension means for the forward ends of the rear springs.

31. In a vehicle construction, an underframe serving as body underframe and chassis without the intermediary of a separate body underframe and having inwardly presenting channel sills, and a cowl unit embodying sub-sills and post members each overlapping the sides of said sills, the sub-sills being provided at the top with means resting on and secured to the tops of the sills and the post members being secured to the sides of said sills through their overlapping portions.

32. A pressed metal top rail for vehicle bodies formed of a one-piece stamping of channel cross section having its bottom wall outermost, and forming a portion of the outer surface of the body above a door opening, and having its lower side wall adapted to be secured to a door post and formed with a downturned flange constituting a door overlap and at its upper side wall formed with an angular seat facing upwardly and adapted to receive the edge of the roof structure.

33. In a pressed metal vehicle body, the combination with main side sills having "kick-up" portions in the tonneau region, of a seat pan for supporting the seat cushion having its main body arranged in a plane substantially below the tops of said "kick-up" portions of the sills, and having upward extensions at its sides for supporting it from the tops of the sills, whereby a low suspension for the seat is attained.

34. In a vehicle construction, a body superstructure widened out intermediate its ends a substantial distance beyond the usual chassis width, and an underframe having side sills correspondingly widened outwardly intermediate their ends to conform substantially to the contour of the lower edge of the body superstructure, the tops of said sills being substantially in the horizontal plane of the thresholds of the doors, and said body superstructure overlapping the sills of the underframe in two planes, and being rigidly and directly secured thereto to form therewith a unitary combined body and chassis structure, without any intermediate cross and longitudinal members.

35. In a vehicle construction, in combination, an underframe embodying a single set of one-piece pressed metal side sills serving as chassis sills interconnected by a single set of cross members, said sills and cross-members being formed in their upper portion to directly support the flooring and seat structures, and a substantially floorless body superstructure including the framing around the door openings and the outer paneling and having its lower margin formed to overlap the outside of said sills and to further overlap said sills in another plane and directly and rigidly secured thereto in said overlapped portions.

36. A vehicle construction embodying a single set of side sills and cross braces connecting the same constructed and arranged to support the flooring and seat structures in their upper portions, said sills being extended downwardly by vertically deepened portions to provide a wide support for a body superstructure including framing and paneling overlapping said portions and secured thereto, the sills and cross braces further serving as parts of a combined body and chassis underframe without the intermediary of the usual body underframe including cross and longitudinal members.

37. A pressed metal body post of a cross section below the belt line having its main body of relatively deep channel form and provided with lateral and inwardly extending flanges to constitute inner door overlaps, and having its cross section above the belt line of relatively shallow channel form, the bottom of which channel is inwardly displaced from the bottom of the channel section below the belt line and the side walls of which terminate in substantial extension with the side walls of the relatively deep channel below the belt line, the portion of the post above the belt line being in substantial longitudinal projection of the sliding window of the door of the car.

38. In a vehicle body of the closed type, a vertical body post flanking a doorway, said post comprising a pressed metal channel extending from the bottom of the body to the roof and reduced at the belt line both in a fore and aft direction and in a direction transversely of the body to constitute the portion of the post above the belt line of substantially reduced cross sectional area as compared with the portion below said line, whereby a post of adequate strength where strength is desired and one which interferes to a minimum with the full line vision of the occupants of the body is attained.

39. A pressed metal vehicle body comprising a top rail formed of a one piece stamping of channel cross section having its bottom wall outermost and its top side wall provided with an upturned flange at its inner edge forming with said side wall an outwardly and upwardly facing angular seat adapted to position the roof thereon, and a vehicle body post connected with the lower side wall.

In testimony whereof I hereunto affix my signature.

JOSEPH LEDWINKA.